(12) United States Patent
Mack et al.

(10) Patent No.: US 6,500,883 B1
(45) Date of Patent: Dec. 31, 2002

(54) ORGANOSILANE-AND/OR ORGANOSILOXANE-CONTAINING AGENT FOR FILLED POLYAMIDE

(75) Inventors: Helmut Mack, Rheinfelden (DE); Peter Jenkner, Rheinfelden (DE); Roland Edelmann, Wehr (DE); Dieter Barfurth, Rheinfelden (DE); Alber-Johannes Frings, Rheinfelden (DE); Burkhard Standke, Loerrach (DE); Jaroslaw Monkiewicz, Rheinfelden (DE); Michael Horn, Rheinfelden (DE); Thomas Schlosser, Inzlingen (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/660,173

(22) Filed: Sep. 12, 2000

(30) Foreign Application Priority Data

Dec. 22, 1999 (DE) .......................... 199 61 972

(51) Int. Cl.⁷ .................................. C08K 9/06
(52) U.S. Cl. ...................................... 523/213
(58) Field of Search ........................ 523/213

(56) References Cited

U.S. PATENT DOCUMENTS

| 3,833,534 A | | 9/1974 | Tierney et al. | |
| 3,843,591 A | | 10/1974 | Hedrick et al. | |
| 4,370,436 A | * | 1/1983 | Nakamura | 524/322 |
| 4,639,476 A | * | 1/1987 | Tajiri | 523/213 |
| 4,717,742 A | * | 1/1988 | Beshay | 523/203 |
| 4,740,538 A | | 5/1988 | Sekutowski | |
| 4,804,720 A | | 2/1989 | Tamura et al. | |
| 5,219,940 A | * | 6/1993 | Nakano | 525/133 |
| 5,282,998 A | | 2/1994 | Horn et al. | |
| 5,541,249 A | | 7/1996 | Hughes et al. | |
| 5,571,851 A | * | 11/1996 | Freeman | 523/212 |
| 5,629,400 A | | 5/1997 | Standke et al. | |
| 3,846,367 A | | 11/1997 | Sekutowski | |
| 6,255,512 B1 | | 7/2001 | Standke et al. | |

FOREIGN PATENT DOCUMENTS

| DE | 198 18 923 | 4/1998 |
| DE | 198 18 924 | 4/1998 |
| DE | 198 30 128 | 7/1998 |
| DE | 198 49 308 | 10/1998 |
| DE | 199 29 021 | 6/1999 |
| DE | 199 08 636 | 8/2000 |
| EP | 0 136 540 | 4/1985 |
| EP | 0 342 788 A1 | 11/1989 |
| EP | 0 382 370 A1 | 8/1990 |
| EP | 0 518 057 | 12/1992 |
| EP | 0 716 127 | 6/1996 |
| EP | 0 716 128 | 6/1996 |
| EP | 0 832 911 | 4/1998 |
| EP | 0 953 591 | 11/1999 |
| EP | 0 955 344 | 11/1999 |
| EP | 0 970 985 | 1/2000 |
| EP | 0 997 469 | 5/2000 |
| EP | 1 063 655 | 12/2000 |

* cited by examiner

*Primary Examiner*—Paul R. Michl
(74) *Attorney, Agent, or Firm*—Oblon, Spivak, McClelland, Maier & Neustadt, P.C.

(57) ABSTRACT

Fillers surface-modified by treatment with an organosilane- and/or organosiloxane-containing agent for preparing filled polyamide compositions.

18 Claims, No Drawings

US 6,500,883 B1

ORGANOSILANE-AND/OR ORGANOSILOXANE-CONTAINING AGENT FOR FILLED POLYAMIDE

BACKGROUND OF THE INVENTION

1. Field of the Invention

The present invention relates to organosilane- and/or organosiloxane-containing agents for modifying the surface of fillers and includes their use for preparing filled polyamide compounds. The present invention further relates to surface-modified fillers, to polyamides filled therewith and to products produced on this basis.

2. Background of the Invention

It is known that fillers can be incorporated into polymers. One motive for doing this is cost saving. Some of the expensive polymer can be replaced by low cost extending filler. A further reason is the controlled modification of mechanical properties of the polymer. The filler then becomes a functional filler. This method can give a lasting improvement in the mechanical properties, such as tensile strength and flexural strength, of filled polyamide compounds, for example (referred to below as PA compounds).

Use has long been made of aminosilanes, e.g. DYNASYLAN® AMEO, to obtain relatively high filler levels (U.S. Pat. No. 3,843,591, EP 0136 540 B1). The disadvantage is the poor toughness of PA compounds prepared using aminopropyltrialkoxysilane. A typical PA compound comprises two completely different base components: an inorganic mineral and an organic polymer. The inorganic mineral is generally hydrophilic and has an ionic structure. The organic polymer is usually rather hydrophobic and has a covalent structure. The two base components have different coefficients of expansion, surface tensions, flexural strengths, etc. The greatest incompatibility is found at the interface between the inorganic and organic components. This is usually the point of weakness in a filled PA compound. Modifying the interface with aminoalkoxysilanes gives rise to a bonding bridge and thus to an increase in the strength of the PA compound. Although the aminosilane improves many mechanical properties, this does not apply to impact resistance properties.

Water-based compositions for specific amino-functional silicon compounds, inter alia those known as "bisaminosilanes" are disclosed in German Patent Application 199 08 636.2, and these can be used, for example, for modifying the surfaces of glass fibers or mineral fibers, and also for the surface modification or treatment of pigments.

EP 0 518 057 B1 discloses mixtures of vinyl-/alkyl-/alkoxy-containing siloxanes, used as crosslinking agents for thermoplastic polyolefins. Mixtures of aminopropyl-/alkoxy-/alkyl-functional siloxane oligomers are disclosed in German Patent Application 198 49 308.8, where the mixtures are used, inter alia, as coupling agents in filled thermoplastic compounds, in the coating of glass fibers, or else for silanizing fillers or pigments.

Water-based organopolysiloxane-containing compositions are disclosed in European Patent Applications EP 0 716 127 A2, EP 0 716 128 A2 and EP 0 832 911 A1, and these are essentially obtainable by mixing water-soluble aminoalkylalkoxysilanes and, if desired, glycidic-ether- or else methacryloxy-alkylalkoxysilanes with non-water-soluble alkylsilanes followed by acid catalyzed hydrolysis or, respectively, cocondensation with removal of the alcohol of hydrolysis. Compositions of this type, too, can be used for coating glass fibers, or else for silanizing fillers or pigments.

German Patent Application 198 18 923.0 relates to stable compositions of water-soluble amino- and alkenyl-functional organosiloxanes, and to the preparation of these and their use for modifying the properties of pigments or fillers, such as aluminum oxide, magnesium oxide, silica, chalk, gypsum, borites, glass fibers, glass beads, carbon black, wollastonite, kaolin, mica or talc—to name just a few examples.

German Patent Application 198 18 924.9 moreover teaches a process for preparing surface-modified fillers by way of treatment with an organosiloxane-containing composition, where, besides OH groups, the organosiloxane has at least one amino-functional group and, if desired, other functional groups selected from the group consisting of alkyl, haloalkyl, alkenyl, glycidyl ether alkyl, acryloxyalkyl and methacryloxyalkyl. Fillers of this type are used in adhesives, sealing compounds, polymer compounds, paints and surface coatings.

German Patent Application 198 30 128.6 relates to flame retardants whose surface has been modified by treatment with organosilanes and, respectively, with organosiloxanes. Flame retardants of this type are used, inter alia, in polyamides.

DE 199 29 021.0 describes the use of functional organyloranyloxysilanes or cocondensates of these on carriers in cable compounds.

SUMMARY OF THE INVENTION

An object of the present invention is to provide another way of preparing polyamides which are filled, strong and impact-resistant.

It has been found that in particular fillers which have been treated with an agent A, B or C, these being specified in greater detail below, give good strength properties together with good impact resistance properties in filled, and in particular kaolin-filled, PA compounds.

In a manner which is surprising and advantageous, good or improved impact resistance in the filled polyamide can be brought about with substantial retention of good strength properties by simultaneous modification of the interface between filler and polyamide (PA) with a component having adhesion-promoting properties, for example an aminosilane, and with a component having lubricant properties, for example an alkylsilane or a polyethersilane or a wax based on polyethylene (PE), polypropylene or silicone.

Agglomerate-free dispersion of the filler in the PA polymer matrix is essential, and this is achieved in a highly satisfactory manner by the use of fillers which are treated with one of the above agents.

Said PA compounds moreover have improved rheology and are therefore easier to compound. This implies further cost savings for the compounder.

DETAILED DESCRIPTION OF THE INVENTION AND PREFERRED EMBODIMENTS THEREOF

The present invention provides organosilane- and/or organosiloxane-containing agents A, B and/or C for modifying the surface of fillers which are used in preparing filled polyamide.

Agent A comprises at least one amino-functional silicon compound of the general formula I $$R-NH-(CH_2)_3-Si(CH_3)_x(Z)_{3-x} \quad (I)$$

in which the groups Z are identical or different and Z is an alkoxy group having from 1 to 3 carbon atoms or a hydroxyl group or a chlorine atom, x is 0 or 1 and R is a linear or branched alkyl group having from 1 to 20 carbon atoms, a cycloalkyl group having from 5 to 12 carbon atoms or an aryl group having from 6 to 12 carbon atoms, preferably 3-[N-butylamino]propyltrimethoxysilane, 3-[N-butylamino] propyltriethoxysilane, 3-[N-cyclohexylamino] propyltrimethoxy-silane, or at least one compound known as a "bisaminosilane", preferably "Bis-AMEO": $[(H_5C_2O)_3Si(CH_2)_3NH(CH_2)_3Si(OC_2H_5)_3]$ or "Bis-AMMO": $[(H_3CO)_3Si(CH_2)_3NH(CH_2)_3Si(OCH_3)_3]$, or at least one tertiary aminosilane, such as "Tris-AMEO": $[(H_3CO)_3Si(CH_2)_3]_3N$, or a mixture made from primary and secondary and/or tertiary aminosilanes and/or aminosiloxanes which are obtainable by hydrolysis, condensation or cocondensation of primary, secondary and/or tertiary aminosilanes, where the average degree of oligomerization of the aminosiloxanes is from 2 to 20.

Agent B comprises i) at least one amino-functional silicon compound of the general formula II $$R-Si(CH_3)_x(Z)_{3-x} \quad (II)$$

in which the groups Z are identical or different and Z is an alkoxy group having from 1 to 3 carbon atoms or a hydroxyl group or a chlorine atom, x is 0 or 1 and R is an amino group of the formula $H_2N-[(CH_2)_2NH]_y(CH_2)_3$, where y is 0, 1 or 2, preferably 3-aminopropyltrimethoxysilane (AMMO): $[H_2N(CH_2)_3Si(OCH_3)_3]$, 3-aminopropyltriethoxysilane (AMEO):$[H_2N(CH_2)_3Si(OC_2H_5)_3]$, N-aminoethyl-3-aminopropyltrimethoxysilane (DAMO): $[H_2N(CH_2)_2NH(CH_2)_3Si(OCH_3)_3]$, or N-aminoethyl-N'-aminoethyl-3-aminopropyltrimethoxysilane (TRIAMO): $[H_2N(CH_2)_2NH(CH_2)_2NH(CH_2)_3Si(OCH_3)_3]$, and/or comprises at least one secondary aminosilane, and/or comprises at least one tertiary aminosilane, and comprises ii) at least one alkyl-functional silicon compound of the general formula III $$R'-Si(CH_3)_x(Z)_{3-x} \quad (III)$$

in which the groups Z are identical or different and Z is an alkoxy group having from 1 to 3 carbon atoms or a hydroxyl group or a chlorine atom, x is 0 or 1 and R' is a linear or branched or cyclic, if desired fluorine-substituted, alkyl group having from 1 to 16 carbon atoms, or comprises at least one alkenyl functional silicon compound of the general formula IV $$CH_2=CH-(CH_2)_n-Si(CH_3)_x(Z)_{3-x} \quad (IV)$$

in which the groups Z are identical or different and Z is an alkoxy group having from 1 to 3 carbon atoms or a hydroxyl group or a chlorine atom, x is 0 or 1 and n is an integer from 0 to 20, or comprises a polyether-functional silicon compound of the general formula V $$R-(O-CH_2-CHR')_n-O-(CH_2)_m-Si(CH_3)_x(Z)_{3-x} \quad (V)$$

in which the groups Z are identical or different, Z is an alkoxy group having from 1 to 3 carbon atoms or a hydroxyl group or a chlorine atom, R is a linear or branched alkyl group having from 1 to 4 carbon atoms, R' is a hydrogen atom or a $CH_3$ group, n is an integer from 5 to 20, m is 2 or 3 and x is 0 or 1, and/or if desired, comprises iii) a content of siloxanes which are obtainable by hydrolysis, condensation or cocondensation of compounds of the general formula II, of the secondary aminosilanes—cf. the general formula I—, of the tertiary aminosilanes, compounds of the general formula III, IV or V, where the average degree of oligomerization of the siloxanes is from 2 to 20.

Agent C comprises i) at least one alkyl-functional silicon compound of the general formula III $$R'-Si(CH_3)_x(Z)_{3-x} \quad (III)$$

in which the groups Z are identical or different and Z is an alkoxy group having from 1 to 3 carbon atoms or a hydroxyl group or a chlorine atom, x is 0 or 1 and R' is a linear or branched or cyclic, if desired fluorine-substituted, alkyl group having from 1 to 16 carbon atoms, and comprises ii) at least one alkenyl-functional silicon compound of the general formula IV $$CH_2=CH-(CH_2)_n-Si(CH_3)_x(Z)_{3-x} \quad (IV)$$

in which the groups Z are identical or different and Z is an alkoxy group having from 1 to 3 carbon atoms or a hydroxyl group or a chlorine atom, x is 0 or 1 and n is an integer from 0 to 20, and/or comprises, if desired, iii) a content of siloxanes which are obtainable by hydrolysis, condensation or cocondensation of compounds of the general formulae III and IV, where the average degree of oligomerization of the siloxanes is from 2 to 20.

A particular series of secondary amines are compounds known as bisaminosilanes, such as bis-AMMO and bis-AMEO, and also the N-alkylated aminosilanes of the general formula I, preferably 3-(N-butyl-amino) propyltrimethoxysilane (DYNASYLAN® 1189).

For the purposes of the present invention, bisaminosilanes include those disclosed in DE 199 08 636.2, which also discloses a method for the hydrolysis, condensation or, respectively, cocondensation of primary and secondary aminosilanes. DE 199 08 636.2 also has examples of aminosiloxanes. The entire content of this reference and those listed below is expressly incorporated as part of the disclosure of the present application.

Examples of primary aminosilanes suitable for the present invention are 3-aminopropyltrimethoxysilane (AMMO), 3-aminopropyltriethoxysilane (AMEO), and N-aminoethyl-3-aminopropyltrimethoxysilane (DAMO).

An example of a tertiary aminosilane is $[(H_3CO_3Si(CH_2)_3]_3N$ (tris-AMEO).

Mixtures made from primary and secondary and/or tertiary aminosilanes and/or from aminosiloxanes may generally be prepared by adding each of the individual components while mixing thoroughly.

Agents A preferably comprise at least one aminosilane of the general formula II and at least one secondary aminosilane. Particular preference is given to agents with a content of AMEO or AMMO and from >0 to <100% by weight of bis-AMEO or bis-AMMO as further active component.

Examples of alkylsilanes of formula III are the following compounds: methyltrimethoxysilane (MTMS), methyltriethoxysilane (MTES), ethyltrimethoxysilane (ETMS), ethyltriethoxysilane (ETES), n-propyltrimethoxysilane (PTMO), n-propyltriethoxysilane (PTEO), and octyltriethoxysilane (OCTEO).

Examples of alkenyl-functional silicon compounds of formula IV are: vinyltrimethoxysilane (VTMO), vinyltriethoxysilane (VTEO), and allyltrimethoxysilane.

An example of a polyether-functional silicon compound of formula V which may be used is DYNASYLAN® 4140, a trimethoxysilyl derivative of a polyethylene glycol.

Examples of other siloxanes for the purposes of the present invention, which are generally obtainable by hydrolysis, condensation or cocondensation of compounds of the formula I or II, or else compounds of the general formula III, IV or, respectively, V, and methods for the preparation of corresponding siloxanes are disclosed, in particular, in European Patents EP 0 518 057 B1, EP 0 716 127 A2, EP 0 716 128 A2, EP 0 832 911 A1, or else in German Patent Application 198 49 308.8. Examples of products included in this group are oligomeric propyltriethoxysilane (VPS 9892), oligomeric vinyltrimethoxysilane (DYNASYLAN® 6490) and cooligomeric alkyl/vinylsilane (DYNASYLAN® 6598).

A suitable method for the purposes of the present invention is to use agents B in which i) an aminosilane of the general formula II and ii) at least one alkylsilane of the general formula III or a polyethersilane of the general formula V are present as components, particularly preferably a mixture made from AMEO and MTES or a mixture made from AMEO and DYNASYLAN® 4140.

Preference is also given to agents B in which i) an aminosilane of the general formula II and iii) oligomers of at least one alkylsilane of the general formula III are present as components, for example a mixture of AMEO and a condensate based on PTEO.

For the purposes of the present invention preference is also given to agents B in which i) an aminosilane of the general formula II and ii) at least one alkenylsilane of the general formula IV are present as components, or in which i) an aminosilane of the general formula II and iii) oligomers of at least one alkenylsilane of the general formula IV are present as components, or in which iii) cooligomers of at least one aminosilane of the general formula II and at least one alkylsilane of the general formula III are present as components, or in which iii) cooligomers of at least one aminosilane of the general formula II and at least one alkenylsilane of the general formula IV are present as components.

For the purposes of the present invention, preference is also given to agents C in which i) an alkylsilane of the general formula III and ii) at least one alkenylsilane of the general formula IV are present as components, and/or which are composed of a cooligomer of components i) and ii).

According to the invention, agent A, B or C is used for the treatment of fillers, where these are in particular used for preparing PA compounds.

The fillers may generally be surface-treated with agent A, B or C by combining the fillers and agent, allowing these to interact, if desired with an increase in temperature, and, if desired, then heat-treating the fillers treated in this way once they have been isolated. The process may in particular be carried out as described in DE 198 18 924.9, and reference is made to DE 198 18 923.0 and DE 198 30 128.6.

The fillers preferably used for the present invention are glass fibers, glass beads, wollastonite, calcined kaolin, mica, talc, magnesium hydroxide, melamine cyanurate, montmorillonite or nanocomposites.

The present invention therefore provides the use of an agent A, B or C for the treatment of fillers, in particular those which are used in preparing filled polyamide.

The present invention also provides surface-modified fillers obtained according to the invention.

The present invention also provides products which comprise at least one filler treated according to the invention, in particular the product known as filled polyamide.

All parts set forth are parts by weight unless otherwise indicated.

Non-exclusive examples of polyamides which may be used in the present invention are those of nylon-6 type (poly-e-caprolactam), nylon-6,6 type (polycondensate made form hexamethylenediamine and adipic acid) or nylon-12 type (poly-12-dodecalactam). An example of commercially available nylon-6,6 is given by the ZYTEL® product group from DuPont. However, other polyamides may also be filled with the novel fillers.

Suitable amounts of a novel filler to be used in preparing a filled PA compound are from 0.1 to 70% by weight, preferably from 10 to 40% by weight.

A filled PA compound is generally prepared by mixing the polyamide and the coated filler in a compounding kneader. For this, two sets of metering equipment are used to add firstly polyamide pellets and secondly the filler to a mixer heated above the melting point of the polyamide, so that the desired degree of filling can be complied with. The degree of filling generally means the relationship by weight between polyamide and filler, e.g. if there are 60 parts by weight of polyamide and 40 parts by weight of filler in the compound the degree of filling is 40%. The PA compound coming from the mixer is then generally pelletized and may, for example, be injection molded to give semifinished or finished products.

Examples of products ready for use and produced, for example, by injection molding are a wide variety of housings for electrical devices and parts for motor vehicles, e.g. wheel caps and fan housings, to mention just a few.

The filled PA compounds obtainable according to the invention generally have good strength together with good impact resistance.

The present invention therefore also provides polyamide filled according to the invention, and also products based on a polyamide of this type.

The present invention is described in more detail by way of the examples below.

EXAMPLE 1

Preparation of the Silanized Kaolin Samples (General Preparation)

7000 g of calcined kaolin (POLESTAR 200 R. supplied by ECC, UK) were placed in a LÖDIGE M20 laboratory ploughshare mixer of capacity about 20 liters, and the mixer set in motion. The rotation rate of the mixing element is set at 400 rpm and the temperature of the kaolin is controlled to about 80° C. via the jacket of the mixing vessel, using a thermostat and oil heating medium. After about 30 minutes of preparatory heating, a total of 70 g of the silane or, respectively, the silane mixture is metered in via the metering equipment on the mixer at a rate of about 35 g per minute. Once the full amount of silane has been added the heat supply is switched off and mixing continues for a total of 120 minutes, including 90 minutes at reduced pressure.

EXAMPLE 2

Preparation of Polyamide/kaolin Compounds

The polyamide (ZYTEL 101 L, producer DuPont, dried at 80° C. for 12 hours) is metered at 6.5 kg/in via a screw into a BUSS PR46-11 D Ko-Kneader. The silanized kaolin is added at 4.33 kg/h via the second feed, using a twin screw. The ratio between polyamide and kaolin which results is 60:40, i.e. the degree of filling is 40%. The rotation rate of the kneader is about 150 rpm and the barrel temperature is 290° C. and the throughput about 15 kg/h. The degree of filling is checked by determining the ash content.

The finished compound is pelletized and further processed using an ENGEL ES 240/65 injection-molding machine to give test specimens. Injection molding takes place at a pressure of 2150 bar and at a temperature of about 267° C. Standard tensile specimens (multipurpose specimens No. 84) are molded from the following material combinations:

| Batch No. | Polyamide and kaolin coated with 1% by weight of silane/siloxane (based on kaolin) |
|---|---|
| 1[1] | γ-Aminopropyltrimethoxysilane (DYNASYLAN ® AMEO) |
| 2[1] | γ-Aminopropyltrimethoxysilane, industrial quality (DYNASYLAN ® AMEO-T) |
| 3 | 3-(N-Butylamino)propyltrimethoxysilane (DYNASYLAN ® 1189) |
| 4 | Physical mixture made from 60 parts by weight of DYNASYLAN ® AMEO-T and 40 parts by weight of PTEO oligomer VPS 9892 |
| 5 | Physical mixture made from 2 parts by weight of DYNASYLAN ® AMEO and 1 part by weight of DYNASYLAN ® MTES, (DYNASYLAN ® 1291) |
| 6 | Physical mixture made from 2 parts by weight of DYNASYLAN ® AMEO-T and 1 part by weight of polyethersilane DYNASYLAN ® 4140 |

[1]Comparative examples

EXAMPLES 3 TO 8

Test results for the polyamide/kaolin compounds prepared as in Examples 1 and 2:

EXAMPLE 3

Determination of tensile strength to DIN EN ISO 527

| Batch No. | Modulus of elasticity after 24 h 23° C./50% rel. hum. [N/mm$^2$] | Modulus of elasticity in % of specimen 1 (AMEO) | Modulus of elasticity after 7 days storage in water at 90° C. [N/mm$^2$] | Fall-off in modulus of elasticity in % |
|---|---|---|---|---|
| 1 | 6050.5 | 100.0 | 1523.1 | 25.2 |
| 2 | 6232.1 | 103.0 | 1634.0 | 26.2 |
| 3 | 6257.8 | 103.4 | 1629.1 | 26.0 |
| 4 | 6388.6 | 105.6 | 1628.0 | 25.5 |
| 5 | 6058.4 | 100.1 | 1636.0 | 27.0 |
| 6 | 6048.5 | 100.0 | 1559.8 | 25.8 |

EXAMPLE 4

Determination of flexural strength to DIN EN ISO 178

| Batch No. | Flexural strength after 24 h at 23° C./50% rel. hum. [kj/m$^2$] | Flexural strength in % of specimen 1 (AMEO) |
|---|---|---|
| 1 | 131.3 | 100.0 |
| 2 | 127.6 | 97.2 |
| 3 | 127.7 | 97.3 |
| 4 | 124.9 | 95.1 |
| 5 | 132.5 | 100.9 |
| 6 | 126.2 | 96.1 |

EXAMPLE 5

Determination of impact resistance to DIN EN ISO 179 (Charpy) and DIN EN ISO 180 (Izod)

| Batch No. | After 24 h at 23° C./50% rel. hum. [kj/m$^2$] | In % of specimen 1 (AMEO) |
|---|---|---|
| Impact resistance to DIN EN ISO 179 | | |
| 1 | 38.6 | 100.0 |
| 2 | 32.21 | 83.4 |
| 3 | 41.72 | 108.1 |
| 4 | 42.16 | 109.2 |
| 5 | 37.13 | 96.2 |
| 6 | 47.5 | 123.1 |
| Impact resistance to DIN EN ISO 180 | | |
| 1 | 20.83 | 100.0 |
| 2 | 19.50 | 98.6 |
| 3 | 30.13 | 144.6 |
| 4 | 27.69 | 132.9 |
| 5 | 32.9 | 157.9 |
| 6 | 30.97 | 148.7 |

EXAMPLE 6

Determination of VICAT heat resistance to D/IN EN ISO 306

| Batch No. | VICAT softening point |
|---|---|
| 1 | 261.7 |
| 2 | 261.3 |
| 3 | 260.3 |
| 4 | 259.2 |
| 5 | 260.7 |
| 6 | 261.6 |

EXAMPLE 7

Determination of volume flow index MVR to DIN ISO 1133 at 275° C. and 5 kg load

| Batch No. | MVR in ccm/10 min |
|---|---|
| 1 | 49.17 |
| 2 | 49.43 |
| 3 | 54.27 |
| 4 | 45.62 |
| 5 | 51.41 |
| 6 | 45.99 |

Summary of Test Results

The examples show that, compared with standard surface-modifications using DYNASYLAN® AMEO or AMEO-T, cf. batches 1 and 2, the novel agents, cf. batches 3 to 5, bring about an improvement in the properties and the processability of the kaolin silanized in this way and used in polyamide.

Example 5 shows the marked increase in the impact resistance of the polyamide compounds, especially the increase in impact resistance to DIN EN ISO 180 (Izod impact resistance). This increase in the impact resistance implies an improvement in the performance characteristics of the finished products prepared using the novel polyamide compounds.

In Example 7 it can be seen that the processing of the novel polyamide compounds is also made easier by an increase of approximately 10% in flowability.

Examples 3 and 4 also show that the novel surface-modified fillers have no significant effect on the tensile strength and flexural strength of the polyamide compound.

Thermal properties, shown here in terms of the softening point, are also not significantly affected by surface-modification according to the invention, as seen from Example 6.

This application is based on German priority papers 19961972.7, Dec. 22, 1999, incorporated herein by reference.

What is claimed is:

1. A filler surface-modified by treatment with an organosilane- and/or organosiloxane-containing agent A and optionally agent B for use in preparing a filled polyamide, where agent A
   comprises at least one bisaminosilane, or
   comprises at least one tertiary aminosilane, or
   comprises a mixture of primary and secondary and/or tertiary aminosilanes, or
   aminosiloxanes which are obtained by hydrolysis, condensation or cocondensation of primary, secondary and/or tertiary aminosilanes, where the average degree of oligomerization of the aminosiloxanes is from 2 to 20:

agent B
   i) comprises at least one amino-functional silicon compound of the general formula II

$$R\text{—}Si(CH_3)_x(Z)_{3-x} \quad (II)$$

in which the groups Z are identical or different and Z is an alkoxy group having from 1 to 3 carbon atoms or a hydroxyl group or a chlorine atom, x is 0 or 1 and R is an amino group of the formula $H_2N\text{—}((CH_2)_2NH)_y(CH_2)_3\text{—}$, where y is 0, 1 or 2,
   and/or
   comprises at least one secondary aminosilane,
   and/or
   comprises at least one tertiary aminosilane,
   and
   ii) comprises at least one alkyl-functional silicon compound of the general formula III $$R'\text{—}Si(CH_3)_x(Z)_{3-x} \quad (III)$$

in which the groups Z are identical or different and Z is an alkoxy group having from 1 to 3 carbon atoms or a hydroxyl group or a chlorine atom, x is 0 or 1 and R' is a linear or branched or cyclic, if desired fluorine-substituted, alkyl group having from 1 to 16 carbon atoms, or
   comprises at least one alkenyl-functional silicon compound of the general formula IV

$$CH_2=CH\text{—}(CH_2)_n\text{—}Si(CH_3)_x(Z)_{3-x} \quad (IV)$$

in which the groups Z are identical or different and Z is an alkoxy group having from 1 to 3 carbon atoms or a hydroxyl group or a chlorine atom, x is 0 or 1 and n is an integer from 0 to 20, or
   comprises a polyether-functional silicon compound of the general formula V

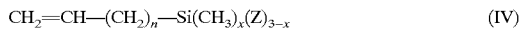

$$R\text{—}(O\text{—}CH_2\text{—}CHR')_n\text{—}O\text{—}(CH_2)_m\text{—}Si(CH_3)_x(Z)_{3-x} \quad (V)$$

in which the groups Z are identical or different, Z is an alkoxy group having from 1 to 3 carbon atoms or a hydroxyl group or a chlorine atom, R is a linear or branched alkyl group having from 1 to 4 carbon atoms, R' is a hydrogen atom or a $CH_3$ group, n is an integer from 5 to 20, m is 2 or 3 and x is 0 or 1, and/or
   iii) optionally, comprises siloxanes which are obtained by hydrolysis, condensation or cocondensation of compounds of the general formula II, of the secondary aminosilanes, of the tertiary aminosilanes, bisaminosilanes, compounds of the general formula III, IV or V, where the average degree of oligomerization of the siloxanes is from 2 to 20.

2. The filler as claimed in claim 1, wherein agent A comprises aminosiloxanes which are obtained by hydrolysis, condensation or cocondensation of primary, secondary and/or tertiary aminosilanes, where the average degree of oligomerization of the aminosiloxanes is from 2 to 20.

3. The filler as claimed in claim 1, wherein
   i) an aminosilane of the general formula II and ii) at least one alkylsilane of the general formula III or a polyethersilane of the general formula V are present as components in the agent B.

4. The filler as claimed in claim 1, wherein
   i) an aminosilane of the general formula II and iii) oligomers of at least one alkylsilane of the general formula III are present as components in the agent B.

5. The filler as claimed in claim 1, wherein
   i) an aminosilane of the general formula II and ii) at least one alkenylsilane of the general formula IV are present as components in the agent B.

6. The filler as claimed in claim 1, wherein
   i) an aminosilane of the general formula II and iii) oligomers of at least one alkenylsilane of the general formula IV are present as components in the agent B.

7. The filler as claimed in claim 1, wherein
   iii) cooligomers made from at least one aminosilane of the general formula II and from at least one alkylsilane of the general formula are present as a component in the agent B.

8. The filler as claimed in claim 1, wherein
   iii) cooligomers made from at least one aminosilane of the general formula II and from at least one alkenylsilane of the general formula IV are present as a component in the agent B.

9. The filler as claimed in claim 1, wherein
   at least one polyethylene wax, one polypropylene wax or one silicone wax is present as a further component in the agent.

10. The filler as claimed in claim 1, wherein the fillers surface-modified are glass fibers, glass beads, wollastonite, kaolin, mica, talc, magnesium hydroxide, melamine cyanurate or montmorillonite.

11. The filler as claimed in claim 1, wherein the filler surface-modified is kaolin.

12. A filled polyamide comprising a filler surface-modified as claimed in claim 1.

13. A filled polyamide comprising kaolin surface-modified as claimed in claim 1.

14. A filled polyamide as claimed in claim 11, wherein
the filler content is from 0.1 to 70% by weight.

15. A filled polyamide as claimed in claim 13, wherein
the filler content is from 0.1 to 7% by weight.

16. The filler as claimed in claim 1, wherein agent A comprises at least one bisaminosilane.

17. The filler as claimed in claim 1, wherein agent A comprises at least one tertiary aminosilane.

18. The filler as claimed in claim 1, wherein agent A comprises a mixture of primary and secondary and/or tertiary aminosilanes.

* * * * *